Patented June 20, 1933

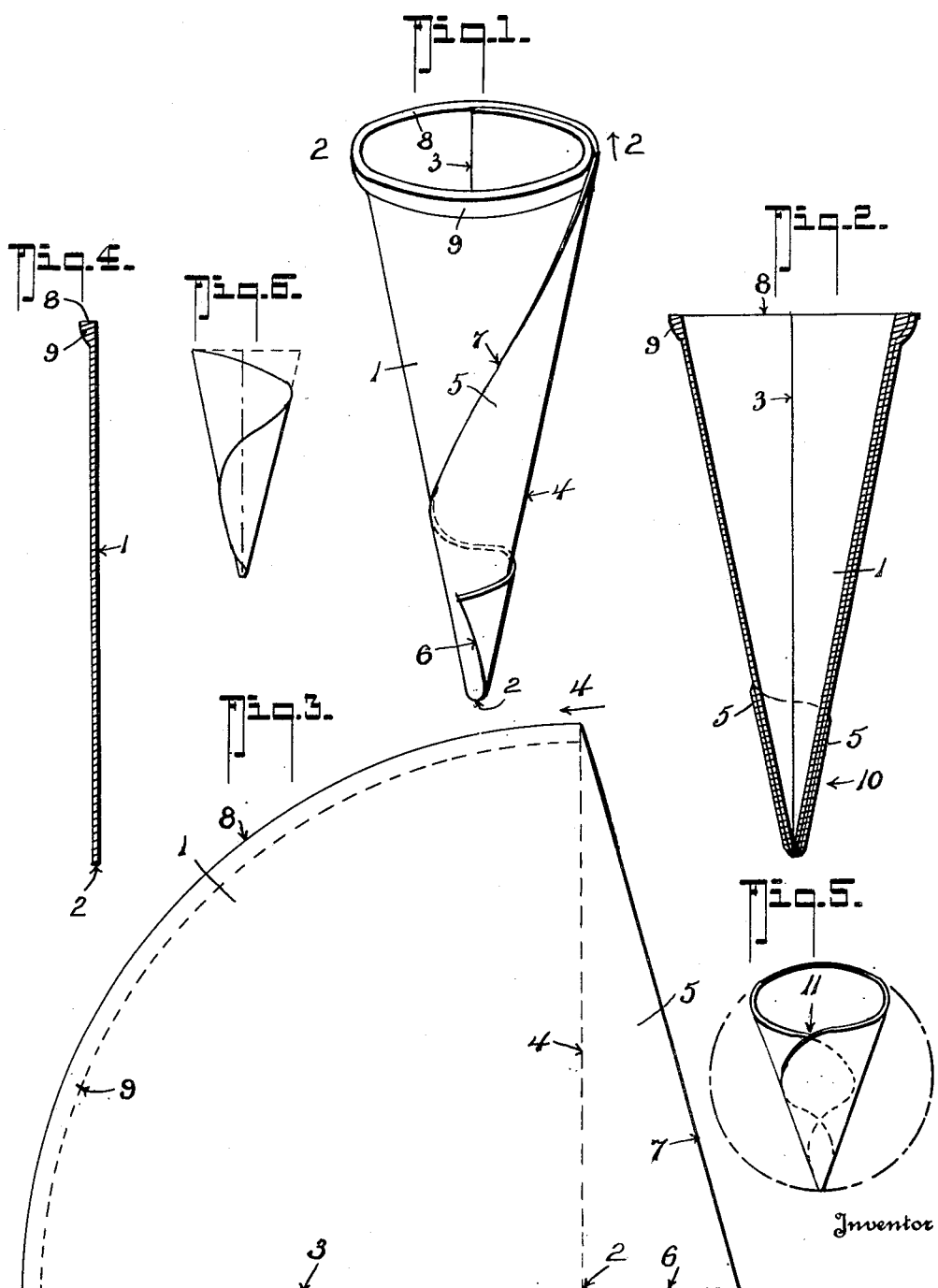

1,915,210

UNITED STATES PATENT OFFICE

JAMES BALTON, OF BALTIMORE, MARYLAND, ASSIGNOR TO JOSEPH SHAPIRO, OF BALTIMORE, MARYLAND

ICE CREAM CONE

Application filed November 27, 1931. Serial No. 577,629.

My invention relates to the art of cup pastry and has particular reference to pastry cones for holding ice cream.

There are two broad types of ice cream cones in common use, one of which is known as the molded cone, i. e., a cone shaped to its final form in a suitable male and female baking mold so that when it leaves the mold it will be seamless; the other is known as a rolled cone, i. e., one which is baked as a flat wafer, the wafer while hot and pliable being then wound round a conical mandrel to impart form to the wafer. Since a larger amount of sugar may be used in the manufacture of rolled cones than is usually practicable in manufacturing molded cones, many customers prefer the rolled cones to the molded cones.

Three major objections to the rolled cone have, however, arisen, namely the wafer must be rolled around the mandrel while it is still hot and pliable and as the rolling operation is usually conducted by hand the cones so manufactured are objectionable on sanitary reasons; the mouths of the rolled cones heretofore made are irregular, the edge being also located at an inclination to the axis instead of normal thereto as in molded cones and no provision has been made to reinforce or strengthen the mouth of the cone to resist breakage; lastly the cone frequently comes unrolled more or less so that it will leak when the ice cream within it melts.

The first of the above objections has already, in a measure, been eliminated by the provision of automatic machinery for rolling the cone, and the other two are overcome by means of my present invention.

Further, my invention has for an object to provide a rolled cone whose blank is so shaped that it can be automatically fed to the rolling mechanism of automatic rolling machinery, always in a uniform manner so as to give finished cones of uniform grade, i. e. each substantially a duplicate of the others.

Further, it is an object to provide a cone whose tip is reinforced and whose mouth is smooth and strengthened so that the cones may be nested for packing and shipment substantially in the same way as for molded cones.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a perspective view of a cone embodying my invention.

Figure 2 is a vertical longitudinal section on the line 2—2 of Figure 1.

Figure 3 is a plan view of a blank from which the cone is rolled.

Figure 4 is a detail cross section of the blank on the line 4—4 of Figure 3.

Figure 5 is a detail perspective view and part diagrammatic view illustrating the present type of rolled cone.

Figure 6 is a side elevation looking from left to right in Figure 5, the dotted lines in Figure 6 being diagrammatic to compare the former rolled cone with the cone of my invention.

In the drawing in which like numerals of reference indicate like parts in all of the figures, 1 designates the body of the wafer blank, the blank having a point 2 from which the edge 8 is struck as a center, the edge 8 in the finished product being the mouth edge of the cone. 3 and 4 designate radius lines from the center 2 to the curved perimeter 8, which lines in the preferred embodiment of the invention are at right angles to each other but may vary somewhat in degree as may be found convenient in practice. The radius 3 constitutes a straight edge which can be fed against the stops of the automatic machine, thus giving a uniform position to the blank in an automatic machine so that it may be picked up by the rolling mandrel always in a uniform way.

From the other radius 4 extends a triangular extension 5, the side of least length 6 being preferably a continuation of the straight edge 3 while the hypotenuse 7 of the triangle extends from the line 6 to the point where the radius 4 joins the curve 8, thereby placing the part of the triangle 5 which is of greatest width adjacent the center of curvature 2.

9 indicates a thickened bead-like band adjacent the edge 6 which serves as a strengthening ring at the mouth of the cone when the blank has been rolled up as shown in Figure 1. The triangular extension 5 provides a convenient reinforcing portion for the lower end or tip of the cone as shown at 10 in Figures 1 and 2.

In Figure 5 I have shown in dot and dash lines the outline of the blank of which the cone is formed. These blanks are usually of circular or oval shape and the apex of the cone lies not at a center of curvature but in the periphery of the blank so that when the blank is rolled the cone will have its mouth edge inclined to the axis as indicated particularly in Figure 6, instead of at right angles thereto as indicated in dotted lines in that figure. The disadvantage of the inclined mouth is that the ball of ice cream cannot be placed in the cone without danger of breaking the cone, and furthermore because of the dip in the mouth edge indicated by 11 in Figure 5 the placing of the ice cream in the cone has a tendency to start the cone to uncurl or unroll, whereas, as will be seen by mere inspection of Figure 1, such condition is eliminated by my construction. The provision of the reinforcing bead 9 formed by a slight thickening of the curved edge of the blank enables me to provide a cone whose mouth may be given substantial strength similar to molded cones so that the cones may be nested for shipment in substantially the same manner and in substantially the same kind of containers as has heretofore been done with the molded cones.

It is obvious that slight changes in the outline of the blank may be made without departing from the spirit of the invention or the scope of the appended claims, and any suitable ornamentation may be impressed on the exposed face of the blank to suit the desires of the trade. No ornamentation has been illustrated in the drawing as that is of no consequence to my present invention.

From the foregoing description, taken in connection with the accompanying drawing, it is thought the complete construction, operation and advantages of my invention will be clear to those skilled in the art to which it appertains.

What I claim is:

1. A blank for rolled pastry cones comprising the segment of a circle having a straight edge along one side as a radius and having a triangular extension from another radius constituting the other side of the blank, the shorter side of the triangle lying adjacent said straight edge.

2. A rolled ice cream cone of edible material having its mouth edge lying throughout in a plane normal to the axis of the cone and having a reinforcing lap at the tip formed by an extension on the blank.

3. A rolled ice cream cone of edible material having its mouth edge lying throughout in a plane normal to the axis of the cone, and having a thickened ring-like portion at the mouth of the cone and having a reinforcing lap at the tip formed by an extension on the blank.

4. A rolled ice cream cone of edible material whose apex lies at the center of curvature of the mouth edge of the blank from which the cone is rolled and lies in a straight edge of the blank and having a reinforcing lap at the tip formed by a triangular extension on the blank.

5. A rolled pastry cone of edible material whose blank is the segment of a circle, and whose apex lies at the center of curvature of the blank in one edge of the blank and whose mouth edge is the curved edge of the blank and having a reinforcing lap at the tip formed by a triangular extension on the blank.

6. A blank for rolled pastry cones comprising the segment of a circle having a straight edge along one side as a radius and having a triangular extension from another radius constituting the other side of the blank, the shorter side of the triangle lying as a continuation of said straight edge.

7. A blank for rolled pastry cones comprising the segment of a circle having a straight edge along one side as a radius and having a triangular extension from another radius constituting the other side of the blank, the shorter side of the triangle lying as a continuation of said straight edge, the blank having a thickened band adjacent its circumference which comprises a reinforcing ring for the mouth of the cone.

8. A rolled pastry cone having that portion of the same which constitutes the mouth edge provided with an external reinforcing bead lying in a plane substantially normal to the axis of the cone, and having a reinforcing lap at its tip formed by an extension on the blank.

9. A blank for rolled pastry cones comprising a segment of a circle, the radii defining the extent of said segment being at right angles to each other, there being an extension in the form of a triangle along one of said radii as a side, another side of said triangle being a continuation of the other of said radii.

JAMES BALTON.